US012682846B2

(12) United States Patent
Baek

(10) Patent No.: US 12,682,846 B2
(45) Date of Patent: Jul. 14, 2026

(54) DISPLAY DEVICE AND DIMMING METHOD THEREOF

(71) Applicant: LG Display Co., Ltd., Seoul (KR)

(72) Inventor: Sang Hun Baek, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/977,504

(22) Filed: Dec. 11, 2024

(65) Prior Publication Data

US 2025/0218376 A1 Jul. 3, 2025

(30) Foreign Application Priority Data

Dec. 28, 2023 (KR) ........................ 10-2023-0194249

(51) Int. Cl.

| | |
|---|---|
| ***G09G 3/3233*** | (2016.01) |
| ***G09G 3/20*** | (2006.01) |
| ***G09G 3/3266*** | (2016.01) |
| ***G09G 3/3291*** | (2016.01) |

(52) U.S. Cl.

CPC ......... *G09G 3/3233* (2013.01); *G09G 3/2092* (2013.01); *G09G 3/3266* (2013.01); *G09G 3/3291* (2013.01); *G09G 2300/0842* (2013.01); *G09G 2310/0286* (2013.01); *G09G 2310/0289* (2013.01); *G09G 2310/08* (2013.01); *G09G 2320/0276* (2013.01); *G09G 2320/064* (2013.01)

(58) Field of Classification Search

CPC .. G09G 3/3233; G09G 3/2014; G09G 3/2081; G09G 3/2092; G09G 3/32; G09G 3/3266; G09G 3/3291; G09G 2300/0842; G09G 2310/0286; G09G 2310/0289; G09G 2310/08; G09G 2320/0276; G09G 2320/064

See application file for complete search history.

(56) References Cited

U.S. PATENT DOCUMENTS

| | | | | |
|---|---|---|---|---|
| 7,038,668 | B2 * | 5/2006 | Kota | G09G 3/3216 345/658 |
| 9,202,419 | B2 * | 12/2015 | Kim | G09G 3/3406 |
| 9,542,902 | B2 * | 1/2017 | Ishii | G09G 3/3696 |
| 9,620,044 | B2 * | 4/2017 | Kobayashi | G02B 6/0075 |
| 10,762,851 | B2 | 9/2020 | Kwon et al. | |
| 11,138,928 | B2 | 10/2021 | Zhang | |

(Continued)

FOREIGN PATENT DOCUMENTS

| | | | |
|---|---|---|---|
| KR | 20090109767 | A | 10/2009 |
| KR | 102447018 | B1 | 9/2022 |
| KR | 102549917 | B1 | 6/2023 |

*Primary Examiner* — Michael J Jansen, II

(74) *Attorney, Agent, or Firm* — Seed Intellectual Property Law Group LLP

(57) ABSTRACT

The present disclosure relates to display device and dimming method thereof. A dimming method according to one embodiment of the present specification includes generating a first emission signal, generating a duty ratio signal based on a digital brightness value, generating a second emission signal by applying the duty ratio signal to the first emission signal, and adjusting an emission time of a light emitting element using the second emission signal, and a start position of the duty ratio signal within one frame is moved at regular time intervals. Accordingly, the visibility of horizontal band noise of a screen may be reduced.

26 Claims, 9 Drawing Sheets

(56) References Cited

U.S. PATENT DOCUMENTS

| | | | | |
|---|---|---|---|---|
| 11,415,831 | B2 * | 8/2022 | Shin | G09G 3/342 |
| 11,545,068 | B2 * | 1/2023 | Han | G09G 3/2092 |
| 11,710,460 | B2 * | 7/2023 | Park | G09G 3/3291<br>345/204 |
| 11,862,105 | B2 * | 1/2024 | Jung | G09G 3/3266 |
| 12,354,534 | B1 * | 7/2025 | Tang | G09G 3/32 |
| 2001/0003467 | A1 * | 6/2001 | Mochizuki | H04N 7/0135<br>348/E7.012 |
| 2002/0044143 | A1 * | 4/2002 | Kota | G09G 3/3216<br>345/204 |
| 2011/0141002 | A1 * | 6/2011 | Kim | G09G 3/342<br>345/102 |
| 2015/0221276 | A1 * | 8/2015 | Ishii | G09G 3/3685<br>345/98 |
| 2015/0279256 | A1 * | 10/2015 | Kobayashi | G09G 3/3413<br>345/694 |
| 2021/0096423 | A1 * | 4/2021 | Shin | G09G 3/342 |
| 2021/0264845 | A1 * | 8/2021 | Han | G09G 3/2092 |
| 2022/0068224 | A1 * | 3/2022 | Park | G09G 3/3233 |
| 2023/0178028 | A1 * | 6/2023 | Jung | G09G 3/3266 |
| 2025/0218376 | A1 * | 7/2025 | Baek | G09G 3/3291 |

* cited by examiner

| DBV | Duty Ratio |
|---|---|
| 65535 | 65535 |
| 52000 | 52000 |
| 37500 | 44000 |
| 22500 | 36000 |
| 11000 | 28000 |
| 5000 | 20000 |
| 2500 | 12000 |
| 1400 | 8000 |
| 900 | 4000 |
| 400 | 1000 |
| 0 | 0 |

*FIG. 6*

DISPLAY DEVICE AND DIMMING METHOD THEREOF

CROSS-REFERENCE TO RELATED APPLICATION

This application claims priority to and the benefit of Korean Patent Application No. 10-2023-0194249, filed on Dec. 28, 2023, the disclosure of which is incorporated herein by reference in its entirety.

BACKGROUND

Technical Field

The present specification relates to a display device and a dimming method thereof, and more specifically, to a display device that adjusts the brightness of a screen using a duty ratio signal of which a pulse generation position within one frame is spread over time, and a dimming method thereof.

Description of Related Art

With the development of information technology, many related technologies are being developed in the field of display devices for displaying visual information as video or images. A display device includes a display panel including a plurality of sub pixels, a driving circuit supplying signals for driving the display panel, a power supply unit supplying power to the display panel, and the like, and the driving circuit includes a gate driving circuit and a data driving circuit supplying gate signals and data signals, respectively, to the display panel.

BRIEF SUMMARY

An emission time of a light emitting element may be adjusted using a pulse width modulation (PWM) method by adjusting an on-off duty ratio of an emission signal, which is a gate signal, and thus the brightness of a screen may be adjusted. The inventors of the present disclosure have recognized that when the display device is driven in this way, a position and a point in time of an on section of the emission signal within the display panel vary depending on the operation of a shift register of a gate-in-panel (GIP) circuit, where horizontal band noise is generated on the screen due to luminance deviation between pixel lines and the horizontal band noise has a predetermined position and width depending on the on-off duty ratio of the emission signal.

In order to address the various technical problems in the related art, including the technical problem described above, the present specification is directed to providing a display device for adjusting the brightness of a screen using a duty ratio signal of which a pulse generation position within one frame is spread over time and a dimming method thereof.

The specification disclosure is also directed to providing a display device for adjusting the brightness of a screen by applying a duty ratio signal of which a start position within one frame is moved over time to an emission signal, and a dimming method thereof.

The specification disclosure is also directed to providing a display device for adjusting the brightness of a screen by controlling a movement degree, a movement form, and a time interval of a start position of a duty ratio signal applied to an emission signal within one frame, and a dimming method thereof.

Problems to be solved by the present specification are not limited to those mentioned above, and other problems not mentioned will be clearly understood by those skilled in the art from the following description.

According to an aspect of the present specification, there is provided a dimming method including generating a first emission signal, generating a duty ratio signal based on a digital brightness value, generating a second emission signal by applying the duty ratio signal to the first emission signal, and adjusting an emission time of a light emitting element using the second emission signal, and a start position of the duty ratio signal within one frame is moved at regular time intervals.

According to another aspect of the present specification, there is provided a display device including a display panel including pixels, a gate driver configured to generate a gate signal including an emission signal and supply the gate signal to the pixels through gate lines, a data driver configured to generate a data signal and supply the data signal to the pixels through data lines, and a timing controller configured to control each of the gate driver and the data driver, and the timing controller generates a duty ratio signal of which a start position within one frame is moved at regular time intervals and adjusts an emission time of a light emitting element through a second emission signal obtained by applying the duty ratio signal to a first emission signal.

Details of other embodiments are included in the detailed description and drawings.

BRIEF DESCRIPTION OF THE SEVERAL VIEWS OF THE DRAWINGS

The above and other objects, features and advantages of the present disclosure will become more apparent to those of ordinary skill in the art by describing exemplary embodiments thereof in detail with reference to the accompanying drawings, in which:

FIG. 6 is a table showing an exemplary duty ratio lookup table according to one embodiment of the present specification;

DETAILED DESCRIPTION

Figure 1:
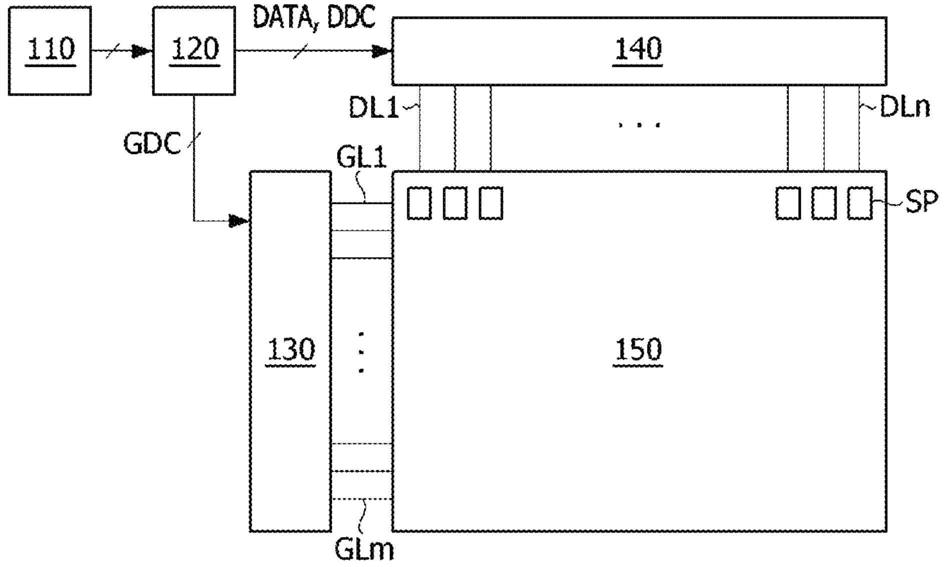
FIG. 1 is a block diagram of a display device according to one embodiment of the present specification.

Advantages and features of the present disclosure, and methods for achieving the advantages and features will be clarified with reference to embodiments described below in detail together with the accompanying drawings. However, the present disclosure is not limited to the embodiments disclosed below, but will be implemented in a variety of different forms. The present embodiments are only provided to allow disclosure of the present disclosure to be complete, and to completely inform those skilled in the art to which the present disclosure belongs of the scope of the disclosure, and the present disclosure is merely defined by the scope of the claims.

The shapes, sizes, ratios, angles, numbers, etc., disclosed in the drawings for describing embodiments of the present disclosure are illustrative, and the present disclosure is not limited to the matters illustrated. Like reference numerals refer to like elements throughout the specification. Furthermore, in describing the present disclosure, when it is determined that the detailed description of the related known technology may obscure the subject matter of the present disclosure, the detailed description thereof will be omitted. When "include," "have," "comprise," etc., mentioned in the present specification are used, other parts may be added unless "only" is used. In describing a component in the singular, cases where the component is plural are included unless expressly stated otherwise.

In interpreting a component, the component is interpreted as including an error range even with no explicit description.

In describing a position relationship, for example, when a position relation between two parts is described as "on," "over," "under," or "next to," one or more other parts may be disposed between the two parts unless "just" or "directly" is used.

In describing a time relationship, for example, when the temporal order is described as "after," "subsequent to," "next to," or "before," a case where the time relationship is not a continuous one may be included unless "just" or "immediately" is used.

Features of various embodiments of the present specification may be partially or fully coupled or combined with each other and may be variously inter-operated and driven technically, and embodiments may be carried out independently of each other or may be carried out together in a related manner.

Hereinafter, a display device and a dimming method thereof according to an embodiment of the present specification will be described with reference to the accompanying drawings.

FIG. 1 is a block diagram of a display device according to one embodiment of the present specification.

As illustrated in FIG. 1, the display device according to one embodiment of the present disclosure includes an image supply unit 110, a timing controller 120, a gate driver 130, a data driver 140, and a display panel 150.

The image supply unit 110 performs image processing on a data signal and outputs the processed signal together with a vertical synchronization signal, a horizontal synchronization signal, a data enable signal, a clock signal, and the like. The image supply unit 110 supplies the vertical synchronization signal, the horizontal synchronization signal, the data enable signal, the clock signal, the data signal, and the like to the timing controller 120.

The timing controller 120 receives the data signal and the like from the image supply unit 110, and outputs a gate timing control signal GDC for controlling operation timing of the gate driver 130 and a data timing control signal DDC for controlling operation timing of the data driver 140. The timing controller 120 supplies a data signal DATA together with the data timing control signal DDC to the data driver 140.

The timing controller 120 may receive a digital brightness value (DBV), which is information about current driving brightness of the display panel 150 and calculate a duty ratio of a duty ratio signal to be generated and an on time within one frame, that is, an on-pulse time of the duty ratio signal. In addition, the duty ratio signal may be generated based on time information.

The gate driver 130 outputs the gate signal while shifting a level of a gate voltage in response to the gate timing control signal (GDC) supplied from the timing controller 120. The gate driver 130 includes a level shifter and a shift register.

The gate driver 130 supplies the gate signal to the sub-pixels SP included in the display panel 150 through gate lines GL1 to GLm. The gate driver 130 may be formed on the display panel 150 in a gate-in panel method or in the form of an integrated circuit (IC). A part of the gate driver 130 formed using the gate-in-panel method is a shift register.

The gate driver 130 may generate an emission (EM) signal, which is one of the gate signals, and may generate an EM duty ratio signal through combination with the duty ratio signal for controlling the emission time of the light emitting element using a pulse width modulation (PWM) method.

The data driver 140 samples and latches the data signal DATA in response to the data timing control signal DDC supplied from the timing controller 120, converts the digital signal into an analog signal corresponding to the gamma voltage, and outputs the converted signal. The data driver 140 supplies the data signal to the sub-pixels SP included in the display panel 150 through data lines DL1 to DLn. The data driver 140 may be formed in the form of an integrated circuit (IC).

The data driver 140 converts the pixel data of an input image, which is digital data, using a digital to analog converter (hereinafter referred to as a "DAC") and generates an analog data voltage. The DAC receives the pixel data, which is digital data, and receives a gamma reference voltage from a gamma voltage generation circuit in a power supply unit. The data driver 140 uses a voltage dividing circuit to generate the gamma reference voltage as a gamma compensation voltage corresponding to each gray level of pixel data. The DAC disposed in each channel of the data driver 140 outputs a data voltage by converting the pixel data into the gamma compensation voltage through a switch element array for selecting a voltage corresponding to a bit of the pixel data.

The display panel 150 displays images corresponding to gate signals and data signals output from driving circuits including the gate driver 130 and the data driver 140. The display panel 150 is implemented in a flat shape, a curved shape, or a flexible shape depending on the material of a substrate. The display panel 150 includes a display region defined by a plurality of pixels and a non-display region where various signal wires, pads, or the like are formed. A plurality of pixels defined by a plurality of data lines DL1 to DLn and a plurality of gate lines GL1 to GLm are arranged in the display region of the display panel 150, and one pixel includes a plurality of sub-pixels SP. The sub-pixels SP include a red sub-pixel, a green sub-pixel, and a blue sub-pixel, or include a white sub-pixel, a red sub-pixel, a green sub-pixel, and a blue sub-pixel. The sub-pixels SP may have one or more different emission areas depending on the emission characteristics.

A pixel array of the display panel 150 may be provided with a plurality of horizontal pixel lines, and on each horizontal pixel line, a plurality of pixels that are horizontally adjacent and commonly connected to the gate lines may be disposed. Here, each of the horizontal pixel lines may not be a physical signal line, but may be a pixel block of one line implemented by horizontally neighboring pixels.

Figure 2A:
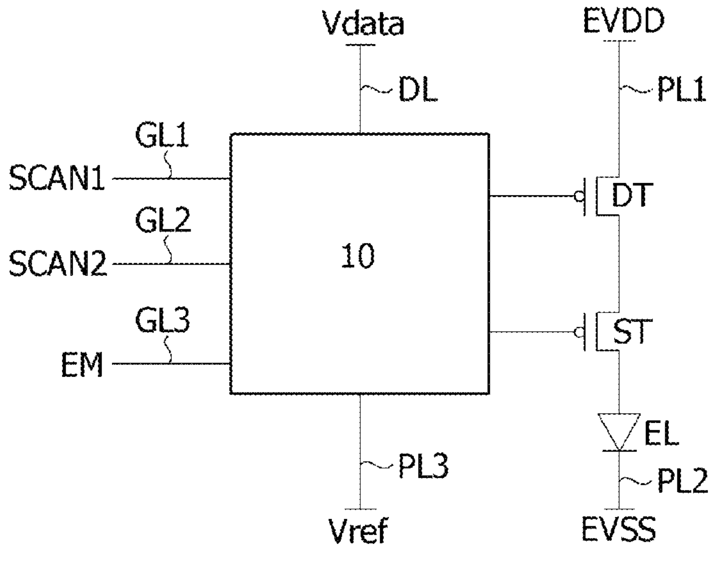
FIGS. 2A and 2B are circuit diagrams illustrating one example of a pixel circuit applicable to the display device according to one embodiment of the present specification.
Figure 2B:
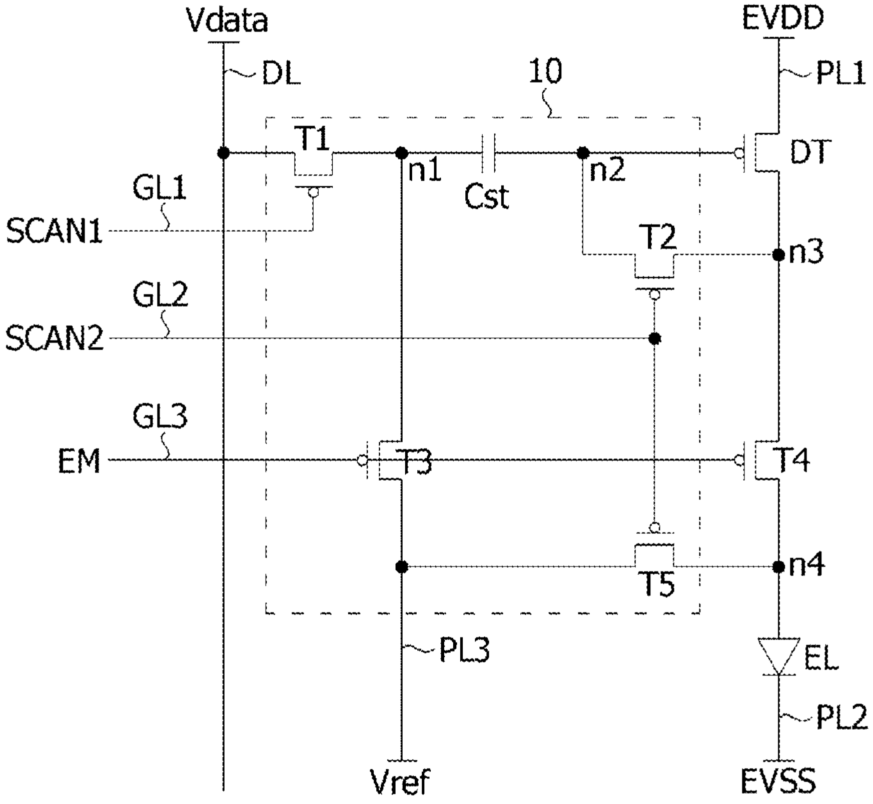
Figure 3:
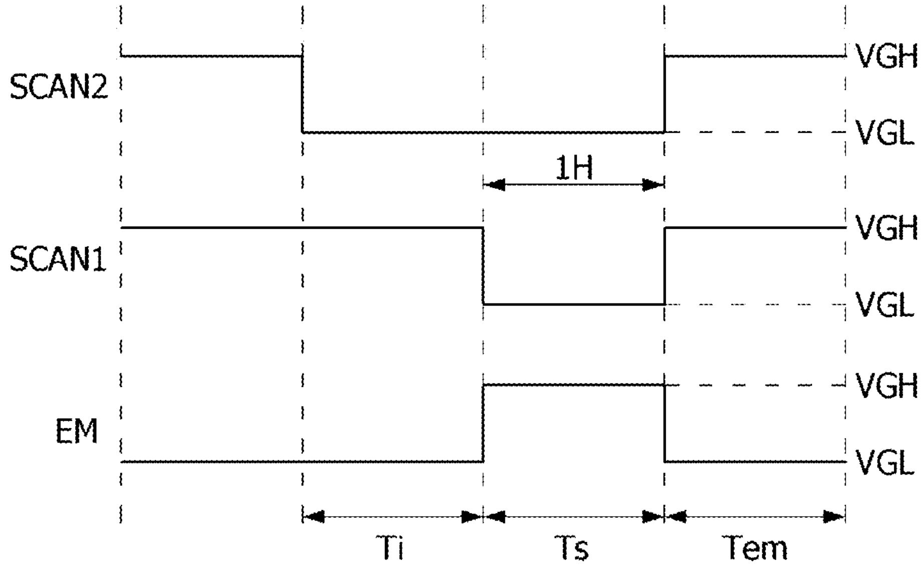
FIG. 3 is a waveform diagram illustrating waveforms of gate signals supplied to the pixel circuit illustrated in FIG. 2B.

FIGS. 2A and 2B are circuit diagrams illustrating one example of a pixel circuit applicable to the display device according to one embodiment of the present specification, and FIG. 3 is a waveform diagram illustrating waveforms of gate signals supplied to the pixel circuit illustrated in FIG. 2B.

A compensation circuit 10 may include a plurality of switch elements and a capacitor. The compensation circuit 10 receives a data voltage Vdata, a scan signal SCAN (e.g., SCAN1, SCAN2, etc.), and an emission signal EM of the pixel data, applies the data voltage Vdata to a gate electrode of a driving element DT, and adjusts the emission time of the light emitting element EL in response to the emission signal.

The compensation circuit 10 may sense a threshold voltage of the driving element DT, compensate for a deviation in the threshold voltage of the driving element DT between sub-pixels, and compensate for changes in the threshold voltage of the driving element DT. One example of the compensation circuit 10 may be the circuit illustrated in FIG. 2B, but it is not limited thereto.

Referring to FIGS. 2B and 3, the pixel circuit of the present disclosure includes a light emitting element EL, a plurality of transistors T1 to T5 and DT, a capacitor Cst, and the like.

The transistors T1 to T5 and DT may be implemented as p-channel transistors, but are not limited thereto. The transistors T1 to T5 and DT include switch elements T1 to T5 and a driving element DT. Each of the switch elements T1 to T5 may be turned on in response to a gate-on voltage VGL and turned off in response to a gate-off voltage VGH.

A driving period of the pixel circuit may be divided into an initialization time Ti during which major nodes n1 to n4 and the capacitor Cst are initialized, a sensing time Ts during which the data voltage Vdata of the pixel data compensated by a threshold voltage Vth of the driving element DT is charged in the capacitor Cst, and an emission time Tem during which the light emitting element EL is driven by the driving element DT. As illustrated in FIG. 3, the initialization time Ti, the sensing time Ts, and the emission time Tem may be defined by the waveforms of gate signals SCAN1, SCAN2, and EM.

The driving element DT drives the light emitting element EL by supplying current to the light emitting element EL according to a gate-source voltage Vgs. The driving element DT includes a gate electrode connected to a second node n2, a first electrode connected to a first power line PL1, and a second electrode connected to a third node n3. A pixel driving voltage EVDD is commonly supplied to the pixels through the first power line PL1.

The light emitting element EL may be implemented as an organic light emitting diode (OLED). The light emitting element EL includes an anode electrode, a cathode electrode, and an organic compound layer formed between the electrodes. The anode electrode of the light emitting element EL is connected to a fourth node n4, and the cathode electrode is connected to a second power line PL2 to which a pixel base voltage EVSS is applied. The organic compound layer may include a hole injection layer (HIL), a hole transport layer (HTL), an emission layer (EML), an electron transport layer (ETL), and an electron injection layer (EIL), but is not limited thereto. When a voltage is applied to the anode electrode and the cathode electrode of the light emitting element EL, holes passing through the hole transport layer (HTL) and electrons passing through the electron transport layer (ETL) move to the emission layer (EML) to form excitons. At this time, visible light is emitted from the emission layer (EML). The light emitting element EL may be implemented in a tandem structure in which a plurality of emission layers is stacked. A tandem-structured light emitting element EL may improve the brightness and lifespan of a pixel.

The capacitor Cst is connected between a first node n1 and the second node n2. The capacitor Cst is charged with a data voltage Vdata compensated by the threshold voltage Vth of the driving element DT.

A first switch element T1 supplies the data voltage Vdata to the first node n1 in response to a gate-on voltage VGL of a first gate signal SCAN1. The first switch element T1 includes a gate electrode connected to a first gate line GL1, a first electrode connected to a data line DL, and a second electrode connected to the first node n1.

The first gate signal SCAN1 includes a pulse of the gate-on voltage VGL that is synchronized with the data voltage Vdata of the pixel data. The pulse of the first gate signal SCAN1 defines the sensing time Ts. During the initialization time Ti and the emission time Tem, the voltage of the first gate signal SCAN1 maintains the gate-off voltage VGH. A pulse width of the first gate signal SCAN1 may be set to one horizontal period (1H). The pulse of the first gate signal SCAN1 may be generated with the gate-on voltage VGL later than a rising edge of a second gate signal SCAN2 and inverted to the gate-off voltage VGH at the same time as the second gate signal SCAN2. The pulse width of the first gate signal SCAN1 is set to be smaller than a pulse width of the second gate signal SCAN2.

A second switch element T2 causes the driving element DT to operate as a diode during the initialization time Ti and the sensing time Ts by connecting the gate electrode of the driving element DT and the second electrode of the driving element DT in response to a gate-on voltage VGL of the second gate signal SCAN2. The second switch element T2 includes a gate electrode connected to a second gate line GL2 to which the second gate signal SCAN2 is applied, a first electrode connected to the second node n2, and a second electrode connected to the third node n3.

The second gate signal SCAN2 may be generated as a pulse of the gate-on voltage VGL. The pulse of the second gate signal SCAN2 defines the initialization time Ti and the sensing time Ts. During the emission time Tem, the voltage of the second gate signal SCAN2 maintains the gate-off voltage VGH.

A third switch element T3 supplies a reference voltage Vref to the first node n1 in response to a gate-on voltage VGL of a third gate signal EM. The reference voltage Vref is commonly supplied to the pixels through a third power line PL3. The third switch element T3 includes a gate electrode connected to a third gate line GL3 to which the third gate signal EM is applied, a first electrode connected to the first node n1, and a second electrode connected to the third power line PL3.

The third gate signal EM includes a pulse of the gate-off voltage VGH. The pulse of the third gate signal EM turns off the third and fourth switch elements T3 and T4 during the sensing time Ts so that a current path between the first node n1 and the third power line PL3 is blocked and a current path between the third node n3 and the fourth node n4 is blocked. In order to precisely express the low-gray luminance of pixels, the third gate signal EM may be generated as a pulse width modulation (PWM) pulse having a duty ratio during the emission time Tem. In this case, the voltage of the third gate signal EM swings between the gate-on voltage VGL and the gate-off voltage VGH according to the duty ratio of the PWM pulse during the emission time Tem.

The fourth switch element T4 forms a current path between the driving element DT and the light emitting element EL during the emission time Tem in response to the gate-on voltage VGL of the third gate signal EM. A gate electrode of the fourth switch element T4 is connected to the third gate line GL3. A first electrode of the fourth switch element T4 is connected to the third node n3, and a second electrode of the fourth switch element T4 is connected to the fourth node n4.

A fifth switch element T5 supplies the reference voltage Vref to the fourth node n4 during the initialization time Ti and the sensing time Ts in response to the gate-on voltage VGL of the second gate signal SCAN2. During the initialization time Ti and the sensing time Ts, the voltage of the anode electrode of the light emitting element EL is initialized to the reference voltage Vref. The light emitting element EL does not emit light because the voltage between the anode electrode and the cathode electrode is less than its threshold voltage during the initialization time Ti and the sensing time Ts. The fifth switch element T5 includes a gate electrode connected to the second gate line GL2, a first electrode connected to a third power line PL3, and a second electrode connected to the fourth node n4.

Hereinafter, a dimming method using an EM duty ratio signal according to one embodiment of the present specification will be described with reference to the drawings.

Figure 4:
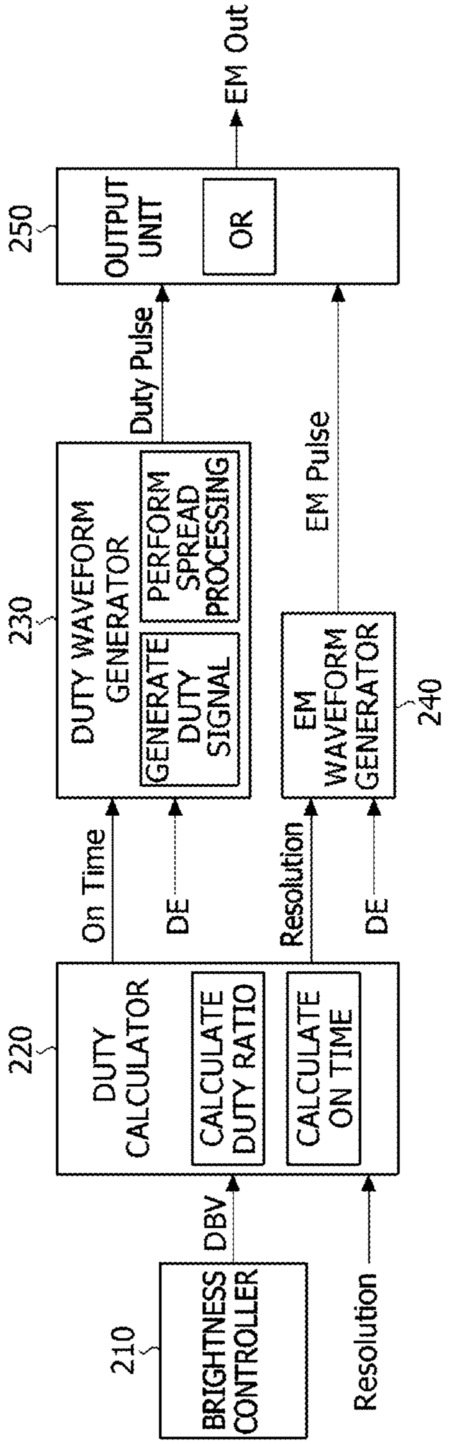
FIG. 4 is a block diagram conceptually illustrating a process of generating an EM duty ratio signal according to one embodiment of the present specification.

FIG. 4 is a block diagram conceptually illustrating a process of generating an EM duty ratio signal according to one embodiment of the present specification.

Referring to FIG. 4, a circuit for generating an EM duty ratio signal may include a brightness controller 210 (also referred to as a brightness controlling circuit 210) that provides a digital brightness value DBV used to generate a duty ratio signal, a duty ratio calculator 220 (also referred to as a duty ratio calculating circuit 220) that calculates a duty ratio and on time information used to generate the duty ratio signal, a duty ratio waveform generator 230 (also referred to as a duty ratio waveform generating circuit 230) that generates the duty ratio signal and performs spread processing, an EM waveform generator 240 (also referred to as an EM waveform generating circuit 240) that generates an emission (EM) signal, and an output unit 250 that generates a final EM duty ratio signal.

The brightness controller 210 provides the digital brightness value DBV, which is information on the current operating brightness of the display panel. For instance, the digital brightness value DBV may include the numeric representation of the intensity of light in the display panel. In some cases, the digital brightness value DBV may include the numeric representation of the intensity of light at a particular point in a digital image in the display panel. The digital brightness value DBV can indicate how bright or dark a pixel is. For grayscale images, the brightness value of each pixel can be represented by an 8-bit number ranging from 0 to 255. Here, 0 represents black (no brightness), and 255 represents white (maximum brightness).

The duty ratio calculator 220 receives the digital brightness value DBV from the brightness controller 210 and calculates a duty ratio and on time information used to generate a duty ratio signal using resolution information.

The duty ratio waveform generator 230 receives on time information about the duty ratio signal output from the duty ratio calculator 220 within one frame and generates the duty ratio signal (e.g., Duty Pulse as shown in FIG. 4). In this case, an on-level width of a pulse of the duty ratio signal may be determined based on a line count for an input data enable (DE) signal. In addition, the duty ratio waveform generator 230 spreads and outputs the position of the duty ratio signal within one frame over time.

The EM waveform generator 240 generates the emission (EM) signal for driving the display panel.

The output unit 250 (also referred to as an output circuit 250) generates and outputs a final EM duty ratio signal by performing an OR operation (or logical sum operation) on the emission (EM) signal generated in the EM waveform generator 240 and output therefrom and the spread-processed duty ratio signal generated in the duty ratio waveform generator 230 and output therefrom.

For reference, in FIG. 4, the duty ratio refers to an on-off duty ratio of the EM duty ratio (EM Out) signal, “On time” refers to the time (unit: H) when the EM duty ratio (EM Out) signal is on within one frame, “EM Pulse” refers to the emission (EM) signal for driving the display panel, and “Duty ratio Pulse” refers to a signal for applying duty ratio to the emission (EM) signal. In addition, “Resolution” refers to a resolution value of the display panel, and DE refers to the data enable signal.

Figure 5:
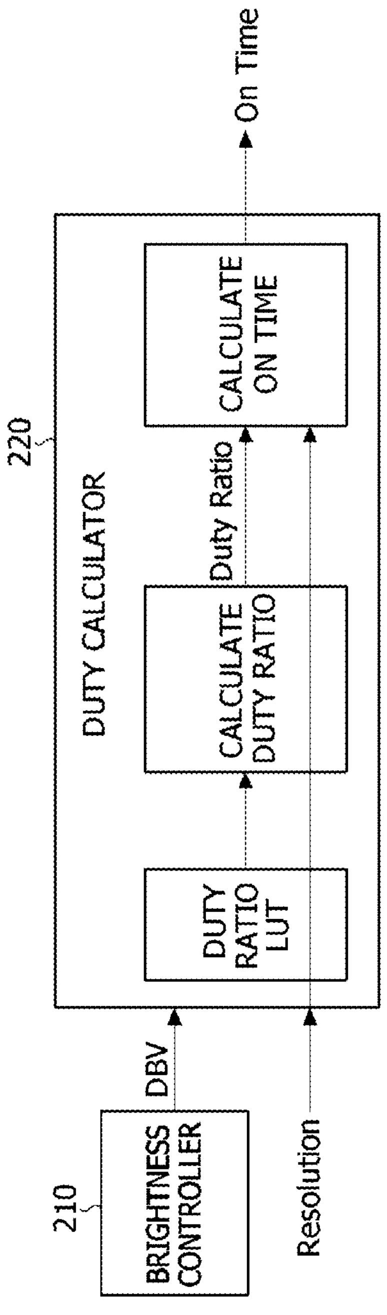
FIG. 5 is a block diagram conceptually illustrating an on-time calculation process according to one embodiment of the present specification.

FIG. 5 is a block diagram conceptually illustrating an on-time calculation process according to one embodiment of the present specification, and FIG. 6 is a table showing an exemplary duty ratio lookup table.

Referring to FIG. 5, as described above, the duty ratio calculator 220 receives the digital brightness value DBV from the brightness controller 210 and calculates a duty ratio and on time information used to generate a duty ratio signal using resolution information.

The duty ratio of the duty ratio signal may be calculated by linear interpolation using a preset duty ratio lookup table (LUT) of the duty ratio signal for the digital brightness value DBV, as shown in FIG. 6. For reference, FIG. 6 corresponds to a duty ratio lookup table for 16-bit DBV.

In addition, the on time within one frame may be calculated as a duty ratio for a length of one frame period (VTotal) obtained by receiving driving resolution information about the current display panel. The one frame period is a combined time of an active section (VActive) where an amount of data of input video equivalent to one frame is input and a vertical blank section (VBlank) with no pixel data between an N-th (N is a natural number) frame period and an N+1-th frame period. Hereinafter, a method of calculating a duty ratio and on time information using exemplary values will be described in detail.

For example, when the resolution is 1920×1080 and VBlank=60, HActive=1920 and VActive=1080, and therefore, VTotal=VActive+VBlank=1080+60=1140.

First, the duty ratio may be calculated by linear interpolation using the lookup table as shown in FIG. 6. In addition, the on time may be calculated using an equation such as On Time=VTotal×Duty Ratio.

When DBV (16 bits)=100% (that is, 65535), the values calculated using the lookup table in FIG. 6 are as follows. Duty Ratio (16 bits)=65535/65535=1, and On Time=1140×(65535/65535)=1140.

When DBV (16 bits)=50% (that is, 32768), the values calculated by linear interpolation using the lookup table in FIG. 6 are as follows. Duty Ratio (16 bits)=41476/65535=0.63 and On Time=1140×(41476/65535)≈721.

When DBV (16 bits)=10% (that is, 6554), the values calculated by linear interpolation using the lookup table in FIG. 6 are as follows. Duty Ratio (16 bits)=22072/65535=0.34 and On Time=1140×(22072/65535)≈384.

Figure 7:
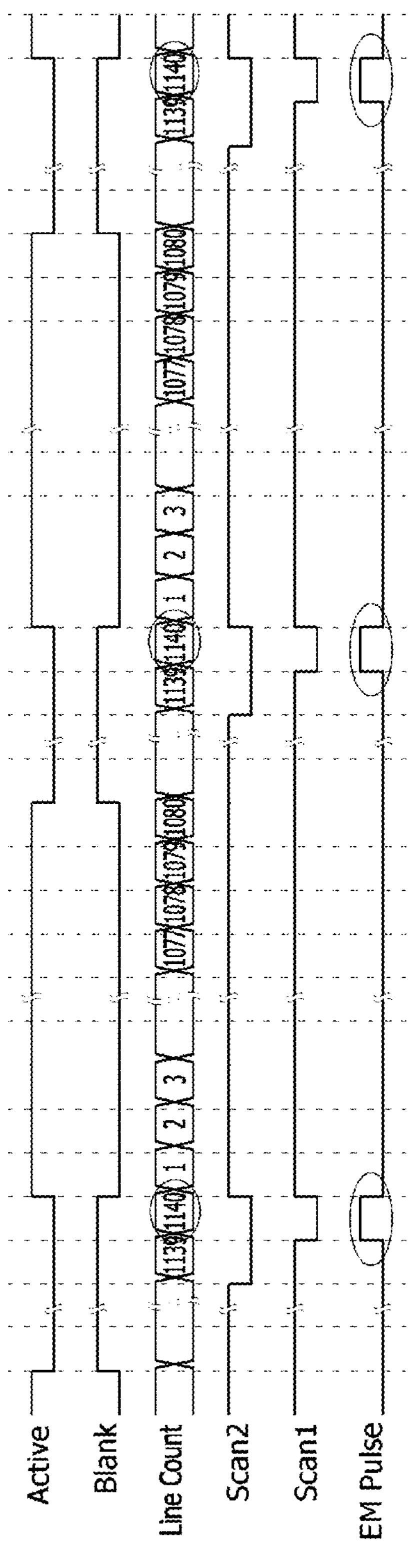
FIG. 7 is a diagram illustrating an exemplary operation of an EM waveform generator according to one embodiment of the present specification.

FIG. 7 is a diagram illustrating an exemplary operation of an EM waveform generator according to one embodiment of the present specification.

Referring again to FIG. 4 along with FIG. 7, the EM waveform generator 240 generates the emission (EM) signal for driving the display panel.

A start position and a width (unit: H) of the emission (EM) signal within one frame are determined according to resolution information. The EM waveform generator 240 may obtain a line count value by counting an input data enable (DE) signal line by line and may generate the emission (EM) signal to have a pulse width as wide as the determined width by being pulsed on at a point where the line count value is equal to a value of the start position of the emission (EM) signal.

Referring again to FIG. 7, when the resolution is 1920×1080 and VBlank=60, the start position of the emission (EM) signal is at point 1140, and the pulse width is 1H.

Figure 8:
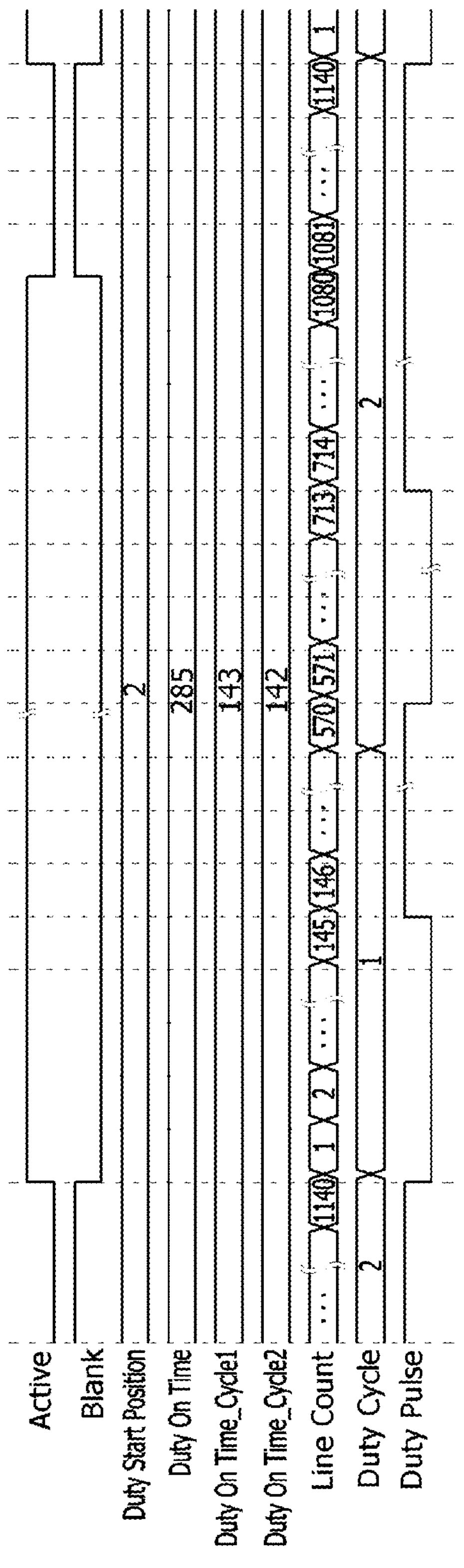
FIG. 8 is a diagram illustrating an exemplary operation of a duty ratio waveform generator according to one embodiment of the present specification.

FIG. 8 is a diagram illustrating an exemplary operation of a duty ratio waveform generator according to one embodiment of the present specification.

Referring again to FIG. 4 along with FIG. 8, the duty ratio waveform generator 230 receives on time information about the duty ratio signal output from the duty ratio calculator 220 within one frame and generates a duty ratio signal. In this case, an on-level width of a pulse of the duty ratio signal may be determined based on a line count for an input data enable (DE) signal. In addition, the duty ratio waveform generator 230 spreads and outputs the position of the duty ratio signal within one frame over time.

The duty ratio signal may be generated to have N cycles (where N is a natural number), and in this case, one cycle may have a length obtained by dividing the length of VTotal within one frame by N. In other words, each cycle of the duty ratio signal generated to have N cycles may have a width of "VTotal/N." In addition, when the duty ratio signal is generated to have N cycles, the duty ratio is applied to each cycle, and the width of the applied on-pulse may be "On Time/N."

Referring again to FIG. 8, when the resolution is 1920×1080, VBlank=60, Cycle=2, the start position is 2, and Duty Ratio (16 bits)=25% (16384/65535), an on time value (Duty ratio On Time in FIG. 8) is On Time=1140×0.25=285 and a width of each cycle is 1140/2=570. In addition, respective on time values (Duty ratio On Time_Cycle1 and Duty ratio On Time_Cycle2 in FIG. 8) for the first and second cycles may be 143 and 142, which are approximate values obtained by dividing a total on time value of 285 by 2 that is the number of cycles.

The first cycle and second cycle of the duty ratio signal generated in this way may be as follows. Since the first cycle has an on-level (low level in FIG. 8) as wide as 143, which is an on-time value of the first cycle, at a start position (Duty ratio Start Position in FIG. 8) 2, the duty ratio signal has a pulse that is an on-level from line count 1 to line count 145 and an off-level (high level in FIG. 8) from line count 146 to line count 570, which is a remaining section up to 570, which is one cycle section. Since the second cycle has an on-level as wide as 142, which is an on time value of the second cycle, at a start position 571, the duty ratio signal has a pulse that is an on-level (low level in FIG. 8) from line count 571 to line count 713 and an off-level (high level in FIG. 8) from line count 714 to line count 1140, which is a remaining section for the width of one cycle section, 570.

The generated duty ratio signal (Duty Ratio Pulse in FIG. 8) is a signal that is the sum of pulses of the first and second cycles as described above.

FIGS. 9A to 9D are views illustrating an example in which a start position of a duty ratio signal is moved according to one embodiment of the present specification.

For a duty ratio signal according to one embodiment of the present specification, a start position within one frame may be moved at regular time intervals. In addition, a movement degree of the start position of the duty ratio signal and a time interval for moving the start position thereof within one frame may be adjusted. Further, movement forms of the start position of the duty ratio signal within one frame may be of various forms including a linear form, a zigzag form, and a random form.

The start position of the duty ratio signal within one frame may be linearly, zigzaggedly, or randomly changed, and a degree (unit: H) and speed of change (unit: frames) of the start position may be controlled. The duty ratio signal may be generated in a manner in which the start position of the duty ratio signal is changed in units of H depending on the degree and speed of change (that is, the movement degree of the start position and the time interval for moving the start position) determined when the start position of the duty ratio signal is changed.

Referring again to FIG. 4, the output unit 250 generates and outputs a final EM duty ratio signal (this signal may be referred to as a second emission signal) by performing an OR operation on the emission (EM) signal generated in the EM waveform generator 240 (this signal may be referred to as a first emission signal) and output therefrom and a spread-processed duty ratio signal generated in the duty ratio waveform generator 230 and output therefrom.

Referring to FIGS. 9A to 9D, when the start position of the duty ratio signal changes at regular intervals over time, a generation position of horizontal band noise also changes over time, resulting in the effect of reducing the visibility of horizontal band noise. In FIGS. 9A to 9D, it can be seen that a horizontal band phenomenon in which the brightness of the screen becomes darker in a screen horizontal line corresponding to a part where the on time (ON in FIGS. 9A to 9D) is included in a VBlank region than in a horizontal line where the on time is not included occurs. For reference, in FIGS. 9A to 9D, for convenience of description regarding the start position of the duty ratio signal, a width of the screen is shown as corresponding to VActive and VBlank, which are the vertical directions in screen resolution.

Figure 9A:
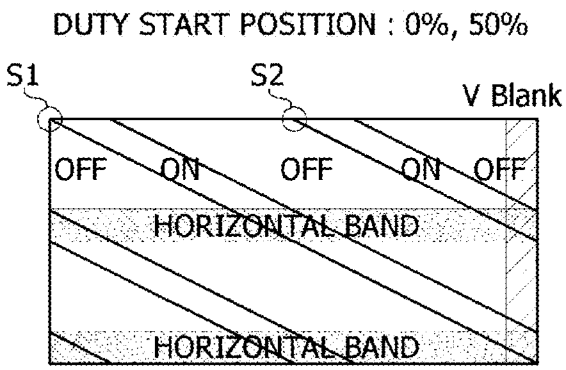
FIGS. 9A to 9D are views illustrating an example in which a start position of a duty ratio signal is moved according to one embodiment of the present specification.
Figure 9B:
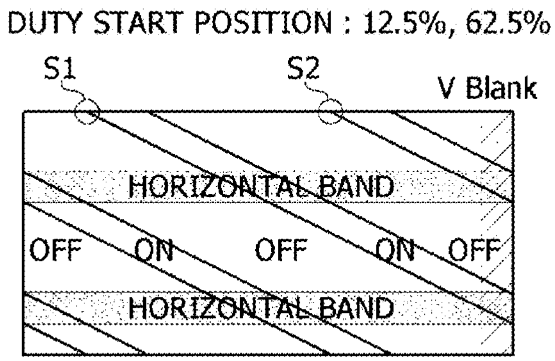
Figure 9C:
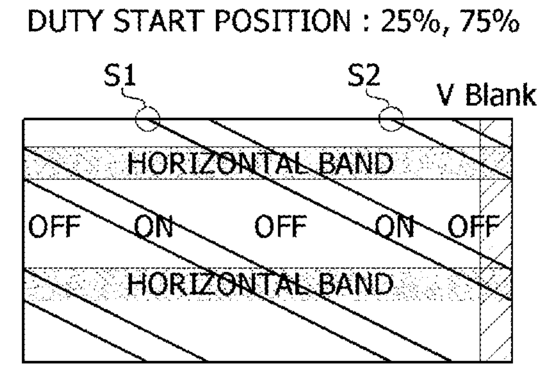
Figure 9D:
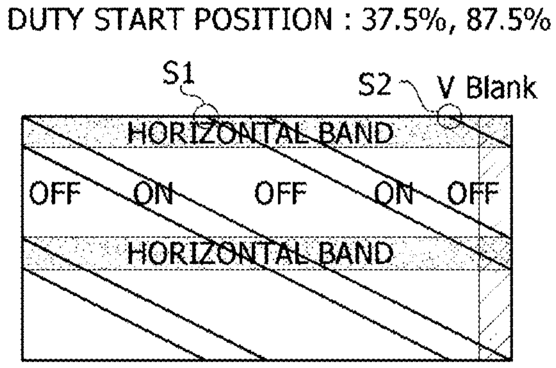

FIG. 9A illustrates a case where start positions S1 and S2 of the duty ratio signal correspond to 0% and 50% of the screen width, respectively, FIG. 9B illustrates a case where the start positions S1 and S2 of the duty ratio signal correspond to 12.5% and 62.5% of the screen width, respectively, FIG. 9C illustrates a case where the start positions S1 and S2 of the duty ratio signal correspond to 25% and 75% of the screen width, respectively, and FIG. 9D illustrates a case where the start positions S1 and S2 of the duty ratio signal correspond to 37.5% and 87.5% of the screen width, respectively.

For example, when the start positions of the duty ratio signal change sequentially from FIG. 9A to FIG. 9D, the horizontal band noise is gradually distributed to the top of the screen (based on FIGS. 9A to 9D) over time while the start positions are moved in a linear manner, thereby reducing the visibility of the horizontal band noise. In addition, when the start positions of the duty ratio signal change in the order of FIG. 9A, FIG. 9C, FIG. 9B, and FIG. 9D, the horizontal band noise is distributed to various heights of the screen (based on FIGS. 9A to 9D) over time while the start positions are moved in a zigzag manner, which also contributes to reducing the visibility of the horizontal band noise.

In one embodiment, when the resolution is 1920×1080, VBlank=60, Cycle=2, the start position=2, and the start position of the duty ratio signal is moved by calculating based on the line count, the time interval for moving the start position may be set to one frame time, and the degree of change in the start position may be set to 12.5%. Since the start position is moved by 12.5% of VTotal every frame time, the start position of the duty ratio signal is moved by 1140×0.125≈143 lines, and when the start position is moved in a linear manner, the start position of the duty ratio signal may be moved in the order of 2-145-288-431-574-717-860-1003- . . . in the line count.

Figure 10A:
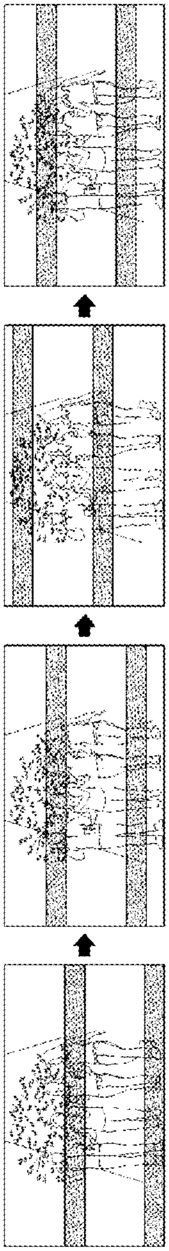
FIGS. 10A to 10C are views exemplarily illustrating movement forms of a start position of a duty ratio signal according to one embodiment of the present specification.
Figure 10B:
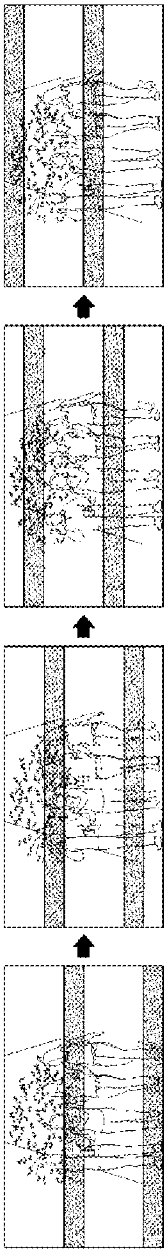
Figure 10C:
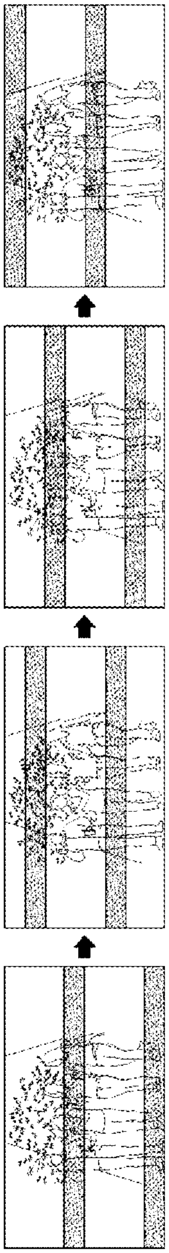

FIGS. 10A to 10C are views exemplarily illustrating movement forms of a start position of a duty ratio signal according to one embodiment of the present specification.

As described above, in one embodiment of the present specification, the movement forms of the start position of the duty ratio signal within one frame may be of various forms including a linear form, a zigzag form, and a random form.

Referring to FIGS. 10A to 10C, FIG. 10A illustrates a case where the start position of the duty ratio signal is moved in the random form, and in this case, since horizontal band noise is dispersed as the position of the horizontal band noise randomly changes for each frame, the visibility thereof is reduced. FIG. 10B illustrates a case where the start position of the duty ratio signal is linearly moved 25% per frame, and in this case, since horizontal band noise is dispersed as the position of the horizontal band noise gradually moves to the top of the screen, the visibility thereof is reduced. FIG. 10C illustrates a case where the start position of the duty ratio signal is moved in a zigzag manner 25% per frame, and in this case, since horizontal band noise is dispersed as the position of the horizontal band noise undulates up and down the screen, the visibility thereof is reduced.

As seen so far, in the dimming method according to one embodiment of the present specification, the brightness of the screen is adjusted by applying the duty ratio signal of which a start position within one frame is moved over time to the emission signal and controlling the movement degree, the movement form, and the time interval of the start position of the duty ratio signal within one frame, thereby achieving advantages of reducing the visibility of horizontal band noise of the screen and preventing the horizontal band noise from being visible.

According to embodiments of the present specification, the brightness of a screen can be adjusted by applying a duty ratio signal of which a start position within one frame is moved over time to an emission signal, thereby minimizing deviation between lines in a light emitting region of a light emitting element and thus reducing the visibility of horizontal band noise of the screen.

According to embodiments of the present specification, the brightness of the screen can be adjusted by controlling a movement degree, a movement form, and a time interval of the start position of the duty ratio signal within one frame applied to the emission signal, thereby reducing the visibility of horizontal band noise of the screen.

Effects of the present specification are not limited to those mentioned above, and other effects not mentioned will be clearly understood by those skilled in the art from the description below.

The embodiments of the present disclosure have been described in detail with reference to the accompanying drawings, but the present disclosure is not necessarily limited to the embodiments, and may be implemented in various modifications without departing from the spirit of the present disclosure. Accordingly, the embodiments disclosed in the present disclosure are not intended to limit the scope of the present disclosure, but to explain the scope, and the scope of the spirit of the present disclosure is not limited by the embodiments. Therefore, it should be appreciated that the embodiments described above are intended to be illustrative in all respects and not restrictive. The scope of the present disclosure should be interpreted based on the accompanying claims, and all technical concepts within the scope equivalent to the claims should be construed as being included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A dimming method, comprising:
generating a first emission signal;
generating a duty ratio signal based on a digital brightness value;
generating a second emission signal by applying the duty ratio signal to the first emission signal; and
adjusting an emission time of a light emitting element of a display device based on the second emission signal,
wherein a start position of the duty ratio signal within one frame is moved at regular time intervals,
wherein the duty ratio signal is generated to have a same duty ratio value over at least a plurality of consecutive frames while the start position is moved,
wherein the duty ratio signal includes a first portion having a first value followed by a second portion having a second value,
wherein the start position of the duty ratio signal corresponds to a start position of the first portion of the duty ratio signal having the first value, and wherein movement of the start position, while maintaining the same duty ratio value, causes visual banding noise to be temporally distributed across the display device.

2. The dimming method of claim 1, wherein the generating of the first emission signal includes:

determining a start position and a width of the first emission signal based on resolution information;

obtaining a line count value by counting an input data enable signal line by line; and generating the first emission signal to have a pulse width as wide as the determined width by being pulsed on at a point where the line count value is equal to the determined start position.

3. The dimming method of claim 1, wherein the generating of the duty ratio signal includes determining a duty ratio of the duty ratio signal as a value matched to the digital brightness value in a preset lookup table.

4. The dimming method of claim 3, wherein the generating of the duty ratio signal includes calculating an on time of the duty ratio signal within one frame based on resolution information and the determined duty ratio.

5. The dimming method of claim 4, wherein the generating of the duty ratio signal includes generating the duty ratio signal to have an on-level pulse width as wide as the calculated on time at the start position within one frame when the duty ratio signal has one cycle.

6. The dimming method of claim 4, wherein the generating of the duty ratio signal includes generating the duty ratio signal so that the determined duty ratio is applied within one cycle of the duty ratio signal when the duty ratio signal has a plurality of cycles.

7. The dimming method of claim 1, wherein the generating of the second emission signal includes performing an OR operation on the first emission signal and the duty ratio signal.

8. The dimming method of claim 1, further comprising: adjusting a movement degree of the start position and the time interval of the duty ratio signal within one frame.

9. The dimming method of claim 1, wherein movement forms of the start position of the duty ratio signal within one frame include one of a linear form, a zigzag form, or a random form.

10. A display device, comprising:

a display panel including pixels, gate lines, and data lines, each pixel including a light emitting element;

a gate driver configured to generate a gate signal and supply the gate signal to the pixels through the gate lines;

a data driver configured to generate a data signal and supply the data signal to the pixels through the data lines; and a timing controller configured to control each of the gate driver and the data driver, wherein the timing controller is configured to:

generate a duty ratio signal of which a start position within one frame is moved at regular time intervals; and adjust an emission time of a light emitting element through a second emission signal obtained by applying the duty ratio signal to a first emission signal, wherein the duty ratio signal is generated to have a same duty ratio value over at least a plurality of consecutive frames while the start position is moved, wherein the duty ratio signal includes a first portion having a first value followed by a second portion having a second value, wherein the start position of the duty ratio signal corresponds to a start position of the first portion of the duty ratio signal having the first value, and wherein movement of the start position, while maintaining the same duty ratio value, causes visual banding noise to be distributed across the display device.

11. The display device of claim 10, wherein the duty ratio signal is generated based on a digital brightness value.

12. The display device of claim 10, wherein the first emission signal is generated to:

determine a start position and a width of the first emission signal based on resolution information;

obtain a line count value by counting an input data enable signal line by line; and have a pulse width as wide as the determined width by being pulsed on at a point where the line count value is equal to the determined start position.

13. The display device of claim 11, wherein a duty ratio of the duty ratio signal is determined as a value matched to the digital brightness value in a preset lookup table.

14. The display device of claim 13, wherein an on time of the duty ratio signal within one frame is calculated based on resolution information and the determined duty ratio.

15. The display device of claim 14, wherein the duty ratio signal is generated to have an on-level pulse width as wide as the calculated on time at the start position within one frame when the duty ratio signal has one cycle.

16. The display device of claim 14, wherein the duty ratio signal is generated so that the determined duty ratio is applied within one cycle of the duty ratio signal when the duty ratio signal has a plurality of cycles.

17. The display device of claim 10, wherein the second emission signal is generated by performing an OR operation on the first emission signal and the duty ratio signal.

18. The display device of claim 10, wherein the movement degree of the start position and the time interval of the duty ratio signal within one frame are adjusted.

19. The display device of claim 10, wherein movement forms of the start position of the duty ratio signal within one frame include one of a linear form, a zigzag form, or a random form.

20. A display device, comprising:

a display panel including pixels, gate lines, and data lines, each pixel including a light emitting element;

a brightness controlling circuit configured to provide a digital brightness value, the digital brightness value indicative of a brightness of the display panel;

a duty ratio calculating circuit configured to:

receive the digital brightness value from the brightness controlling circuit;

receive resolution information indicative of a resolution value of the display panel; and determine a duty ratio and on time information, a duty waveform generating circuit configured to:

receive the on time information and the duty ratio; and generate a duty ratio signal based on the on time information and the duty ratio; and an output circuit configured to generate an emission duty ratio signal, wherein the duty waveform generating circuit is further configured to periodically shift a start position of the duty ratio signal within one frame at defined time intervals while maintaining the determined duty ratio and on time information unchanged over at least a plurality of consecutive frames, wherein the duty ratio signal includes a first portion having a first value followed by a second portion having a second value, wherein the start position of the duty ratio signal corresponds to a start position of the first portion of the duty ratio signal having the first value, and wherein shifting the start position while maintaining the determined duty ratio and on time information, causes visual banding noise to be distributed across the display device.

21. The display device of claim 20, further comprising:

an emission waveform generating circuit configured to:

receive the resolution information from the duty ratio calculating circuit; and generate a first emission signal.

22. The display device of claim 21, wherein generating the emission duty ratio signal is based on a logic OR operation of the first emission signal from the emission waveform generating circuit and the duty ratio signal from the duty waveform generating circuit.

23. The display device of claim 20, wherein the emission duty ratio signal causes to adjust an emission time of the light emitting element of the display panel.

24. The display device of claim 20, wherein generating the duty ratio signal includes:

generating the duty ratio signal so that the determined duty ratio is applied within one cycle of the duty ratio signal when the duty ratio signal has a plurality of cycles.

25. The display device of claim 20, wherein the periodic shifting is performed according to one of a linear, zigzag, or random movement pattern.

26. The display device of claim 20, wherein a movement degree of the start position of the duty ratio signal and a time interval for moving the start position of the duty ratio signal are changed.

* * * * *